F. S. CARR.
SEPARABLE FASTENER AND MEANS FOR SECURING ITS STUD TO CARRYING FABRICS.
APPLICATION FILED JAN. 16, 1920.

1,387,122. Patented Aug. 9, 1921.

Inventor:
Fred S. Carr,
by Emery Booth Janney Varney
Attys

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

SEPARABLE FASTENER AND MEANS FOR SECURING ITS STUD TO CARRYING FABRICS.

1,387,122.   Specification of Letters Patent.   Patented Aug. 9, 1921.

Application filed January 16, 1920. Serial No. 351,793.

*To all whom it may concern:*

Be it known that I, FRED S. CARR, a citizen of the United States, and resident of Newton, in the county of Middlesex and Commonwealth of Massachusetts, have invented an Improvement in Separable Fasteners and Means for Securing Their Studs to Carrying Fabrics, of which the following description, in connection with the accompanying drawings, is a specification, like characters on the drawings representing like parts.

This invention pertains to improvements in separable fasteners. It is among the objects of the invention to provide for the bringing into close relationship of the fabrics carrying the coöperating stud and socket forming the fastener and to provide improved means for securing the stud to its carrying fabric.

In the drawings, which show a preferred form of one embodiment of my invention:

Figure 1:
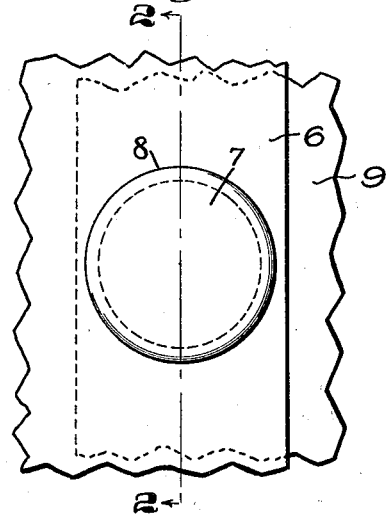
Figure 1 is a front elevation of two pieces of fabric secured together by a preferred form of fastener.
Figure 2:
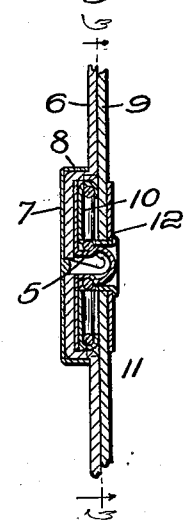
Fig. 2 is a section on the line 2—2 of Fig. 1.
Figure 3:
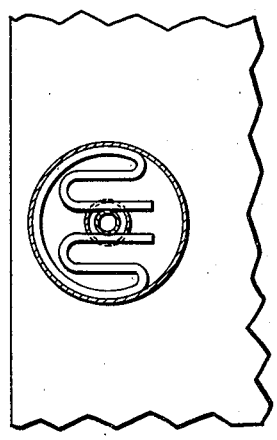
Fig. 3 is a section, partly in elevation, on the line 3—3 of Fig. 2.
Figure 4:
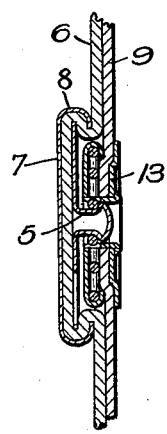
Fig. 4 is a section on the same plane as Fig. 2, showing a modification.

Referring to the drawings and to the preferred form of my invention selected for illustrative purposes, I have shown a stud 5 secured to the stud-carrying fabric 6 in any suitable way, but preferably providing a coöperating plate 7 having lateral flanges 8, adapted to project the general plane of the stud-carrying fabric forwardly relative to the base of the stud, or, otherwise expressed, to admit of positioning of the base of the stud behind the general plane of the stud-carrying fabric. I may effect this in any desirable way, typified by the constructions shown in Figs. 2 and 4. In Fig. 2 the stud 5 is hollow and is secured to its fabric 6 by a rivet clenched within the stud and projecting from the plate 7. In the form of my invention shown in Fig. 4, the stud is secured to its fabric and relative to the plate 7 by the expansion of the base of the stud within the flanged plate 7 in the general manner shown in my co-pending application filed herewith, Serial No. 351,780.

The socket is preferably proportioned so as to enter, wholly or partially, a recess adjacent the base of the stud so that the socket-carrying fabric 9 will be brought into adjacency with the stud-carrying fabric 6. The socket may be of any suitable form. I have shown the socket as including the usual dished casing 10, inclosing the usual spring 11 and having a tubular projection 12 adapted to receive the stud and slotted to permit intersection thereof by the spring, which engages the stud, the tubular projection 12 being extended through the stud-carrying fabric 9 and riveted over a socket - securing washer 13, the rivet being exposed to permit ready expansion thereof and to permit crushing thereof, by pliers or otherwise, in case it is desired to remove the socket from the fabric.

It will be understood that I use the word "fabric" in its broader sense to include not only woven materials, but any flexible carrying medium.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims:

1. A separable fastener comprising, in combination, a socket, a stud for engagement with said socket, said stud having a base, and securing means for securing the stud to its carrying fabric, said securing means having marginal flange means extending in the direction of the base of the stud and effective to bring the stud-carrying fabric to a plane on the stud side of the stud base while forming a pocket about the stud of sufficient area to receive the socket.

2. A separable fastener including two fabric-carried elements, viz., a stud and a socket, the socket projecting beyond the general plane of its carrying fabric, and the stud having its base recessed in its carrying fabric and providing for bringing the general plane of its carrying fabric into adjacency to the general plane of the socket-carrying fabric.

3. A socket for separable fasteners including a dished spring-carrying plate having a central tubular rivet providing a stud-receiving aperture, said rivet projecting through the stud-carrying fabric and through a stud-securing washer on the opposite side of the fabric from said plate, that portion of the tubular rivet projecting through the washer being exposed to permit setting thereof over said washer.

4. A socket for separable fasteners including a dished spring-carrying plate having a central tubular rivet providing a stud-receiving aperture, said rivet projecting through the stud-carrying fabric and through a stud-securing washer on the opposite side of the fabric from said plate, that portion of the tubular rivet projecting through the washer being exposed to permit setting thereof over said washer, and to permit mutilation thereof when set, to effect removal of the socket from the cloth if desired.

In testimony whereof, I have signed my name to this specification.

FRED S. CARR.